United States Patent
Shin et al.

(10) Patent No.: US 9,823,660 B2
(45) Date of Patent: Nov. 21, 2017

(54) SYSTEM FOR DISTANCE TO STOP

(71) Applicant: Ford Global Technologies, LLC, Dearborn, MI (US)

(72) Inventors: Eric Shin, Ann Arbor, MI (US); Scott J. Lauffer, Northville, MI (US); Michael Edward Brewer, Dexter, MI (US); John Broderick, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/000,281

(22) Filed: Jan. 19, 2016

(65) Prior Publication Data

US 2017/0205831 A1   Jul. 20, 2017

(51) Int. Cl.
*G01C 22/00*    (2006.01)
*G05D 1/02*    (2006.01)
*B60T 8/58*    (2006.01)

(52) U.S. Cl.
CPC ............... *G05D 1/0223* (2013.01); *B60T 8/58* (2013.01)

(58) Field of Classification Search
CPC ........ G05D 1/0223; B60T 8/58; B60K 31/00; B60W 10/04; B60W 10/18
USPC ......................................... 701/23, 70, 93, 96
See application file for complete search history.

(56) References Cited

U.S. PATENT DOCUMENTS

| | | | |
|---|---|---|---|
| 7,117,077 B2 | 10/2006 | Michi et al. | |
| 7,308,961 B2 | 12/2007 | Satou et al. | |
| 8,983,751 B2 | 3/2015 | Ham | |
| 2004/0040765 A1* | 3/2004 | Satou | B60K 31/04 180/170 |
| 2007/0192009 A1 | 8/2007 | Braeuchle et al. | |
| 2009/0043474 A1* | 2/2009 | Nakai | B60W 10/00 701/70 |
| 2011/0257862 A1 | 10/2011 | Lee et al. | |
| 2014/0277990 A1 | 9/2014 | Zambou | |

FOREIGN PATENT DOCUMENTS

| | | |
|---|---|---|
| EP | 2902278 A1 | 8/2015 |
| JP | 63045611 | 2/1988 |
| JP | 201114663 | 7/2011 |
| KR | 20120053217 | 5/2012 |
| WO | WO 2008012160 A1 | 1/2008 |

OTHER PUBLICATIONS

UK Search Report dated Jun. 30, 2017.

* cited by examiner

*Primary Examiner* — Gertrude Arthur Jeanglaude
(74) *Attorney, Agent, or Firm* — Frank A. MacKenzie; Bejin Bieneman PLC

(57) ABSTRACT

A distance to stop a vehicle is received. A trajectory including a plurality of acceleration segments, being respective portions of the trajectory prescribing at least one of an acceleration and a jerk elapsing for a specified period of time, is plotted according to the distance. At least one of a vehicle brake and a vehicle propulsion are adjusted based on the trajectory to stop at the distance. The acceleration segments include two or more of a ramp-in, a deceleration, a ramp-out, and a final deceleration.

20 Claims, 5 Drawing Sheets

SYSTEM FOR DISTANCE TO STOP

BACKGROUND

Vehicles make stops while in operation. The stops may be smooth, controlled, or aggressive. The stop may be required at any speed or acceleration (positive or negative) of the vehicle. To bring a vehicle to a stop requires a specific distance and/or time for stopping, and may also depend on other factors (e.g., road friction). But stops made within short distances or limited amounts of time may impart large amounts of jerk on vehicle occupants.

DETAILED DESCRIPTION

In an autonomous vehicle, a virtual operator may evaluate a distance to stop to determine a vehicle trajectory to stop the vehicle at a requested stopping distance while minimizing occupant jerk. The distance to stop divides the trajectory into a plurality of segments, each prescribing an acceleration or a jerk, that allow a computing device to actuate a vehicle propulsion and/or brake to operate the vehicle in at least one of an initiation, a ramp-in, a deceleration, a ramp-out, and a final deceleration. The trajectory may include longer segments for the ramp-in and the deceleration than the segments for the ramp-out and the final deceleration to mimic human operator behavior. The trajectory may transition to the ramp-out segment when the vehicle reaches a threshold speed.

Figure 1:
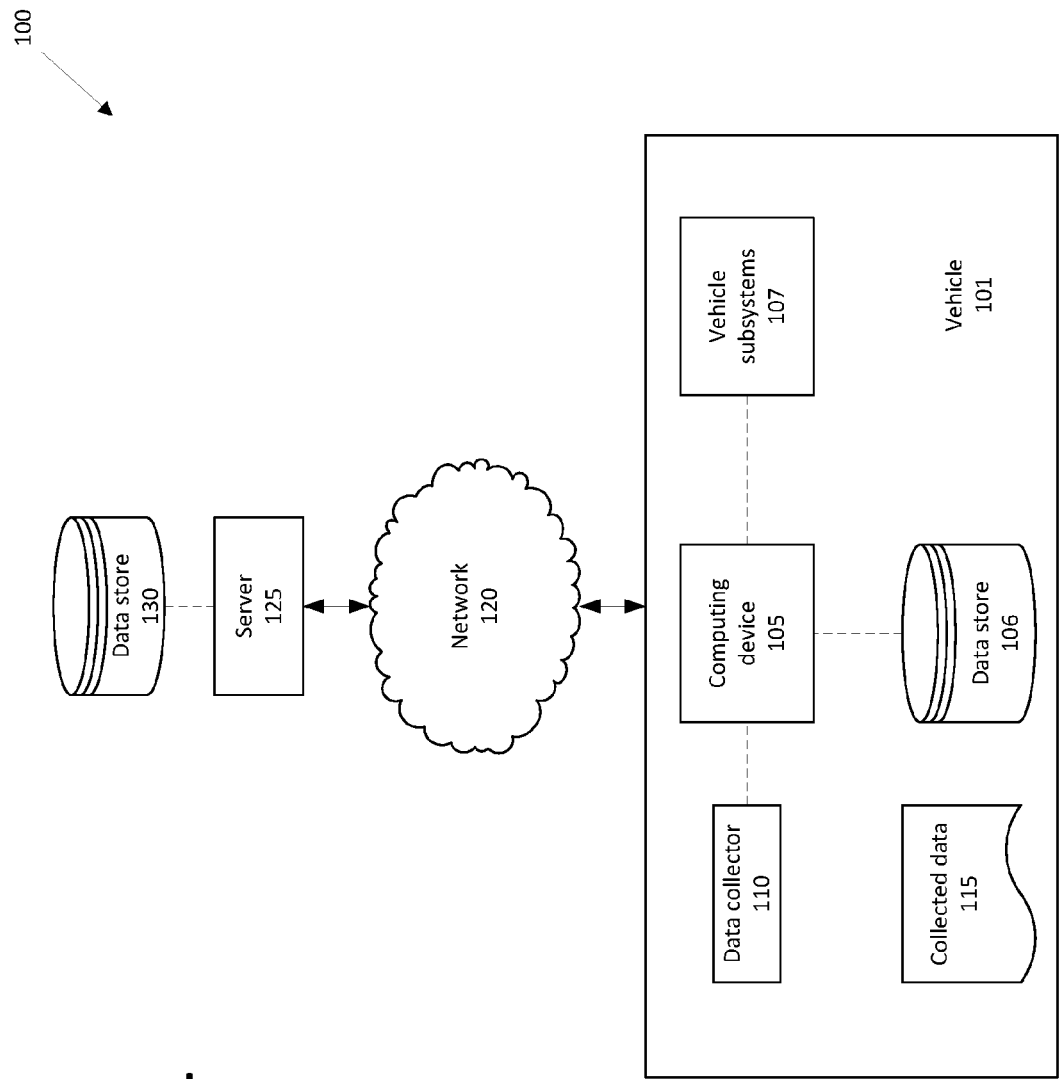
FIG. 1 is a diagram of an example system for determining a distance to stop.

FIG. 1 illustrates an example system 100 for determining a trajectory from a distance to stop, and for operating the vehicle 101 to a complete stop. The computing device 105 is programmed to receive collected data 115 from one or more data collectors 110, e.g., vehicle 101 sensors, related to operation of the vehicle 101. For example, the data 115 may include, and/or may provide a basis for determining, a velocity of the vehicle 101, vehicle 101 acceleration and/or deceleration, data related to vehicle 101 path or steering, etc., including lateral acceleration, curvature of the road, biometric data related to a vehicle 101 operator, e.g., heart rate, respiration, pupil dilation, body temperature, state of consciousness, etc. Further examples of data 115 may include measurements of vehicle 101 systems and components (e.g. a steering system, a powertrain system, a brake system, internal sensing, external sensing, etc.). The computing device 105 may be programmed to collect data 115 from the vehicle 101 in which it is installed, sometimes referred to as a "host vehicle," and/or may be programmed to collect data 115 about and/or from, e.g., via DSRC (Dedicated Short Range Communications) or the like, a second vehicle, i.e., a vehicle other than the vehicle 101, e.g., a "target vehicle."

The computing device 105 is generally programmed for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be programmed for communicating with the network 120, which, as described below, may include various wired and/or wireless networking technologies, e.g., cellular, Bluetooth, wired and/or wireless packet networks, etc.

The data store 106 may be of any known type, e.g., hard disk drives, solid-state drives, servers, or any volatile or non-volatile media. The data store 106 may store the collected data 115 sent from the data collectors 110.

The vehicle 101 may include a plurality of subsystems 107. The subsystems 107 typically include, e.g., a propulsion subsystem 107 (e.g., throttle for an internal combustion engine), a steering subsystem 107, and a braking subsystem 107, and often further include other subsystems 107, such as a climate control subsystem 107, an entertainment subsystem 107, a navigation subsystem 107, etc. The computing device 105 may be programmed to operate some or all of the subsystems 107 with limited or no input from a human operator, i.e., autonomously. Such programming may be referred to as the "virtual operator." The virtual operator includes programming to monitor and/or control one or more subsystems 107, e.g., to provide instructions, e.g., via a vehicle 101 communications bus and/or to electronic control units (ECUs) as are known, to actuate vehicle components, e.g., to apply brakes, change a steering wheel angle, etc. When the computing device 105 operates a subsystem 107 autonomously, this means that the computing device 105 ignores at least some input from the human operator with respect to the subsystem(s) 107 selected for control by the virtual operator. For example, if the human operator attempts to press a gas pedal during virtual operator propulsion operation, the computing device 105 may ignore the human-entered command to increase throttle and accelerate the vehicle 101 according to its programming.

Data collectors 110 may include a variety of devices. For example, various controllers in a vehicle may operate as data collectors 110 to provide data 115 via the CAN bus, e.g., data 115 relating to vehicle 101 speed, acceleration, system and/or component functionality. In addition to providing data 115 concerning a host vehicle 101, the data collectors 110 can provide data 115 relating to one or more second (target) vehicles. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LIDAR, sonar, etc. sensors that could be deployed to determine environmental data, e.g., to measure a distance between the vehicle 101 and other vehicles or objects, the kinds of objects near the trajectory of the vehicle 101, the road conditions, locations of roads and traffic signs, etc. Yet other data collectors 110 could include cameras, breathalyzers, motion detectors, etc., i.e., data collectors 110 to provide data 115 for evaluating a condition or state of a vehicle 101 operator.

Collected data 115 may include a variety of data collected in a vehicle 101. Examples of collected data 115 are provided above, and, moreover, data 115 is generally collected using one or more data collectors 110, and may additionally include data calculated therefrom in the computer 105, and/or at the server 125. In general, collected data 115 may include any data that may be gathered by the data collectors 110 and/or computed from such data.

The system 100 may further include a network 120 connected to a server 125 and a data store 130. The computer 105 may further be programmed to communicate with one or more remote sites such as the server 125, via a network 120, such remote site possibly including a data store 130. The network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be programmed to determine an appropriate action for one or more vehicles 101, and to provide direction to one or more respective vehicle 101 computers 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, records relating to potential incidents generated as described herein, lane departure profiles, etc. Further, the server 125 may store information related to particular vehicle 101 and additionally one or more other vehicles 101 operating in a geographic area, traffic conditions, weather conditions, etc., within a geographic area, with respect to a particular road, city, etc. The server 125 could be programmed to provide alerts to a particular vehicle 101 and/or other vehicles 101.

Figure 2:
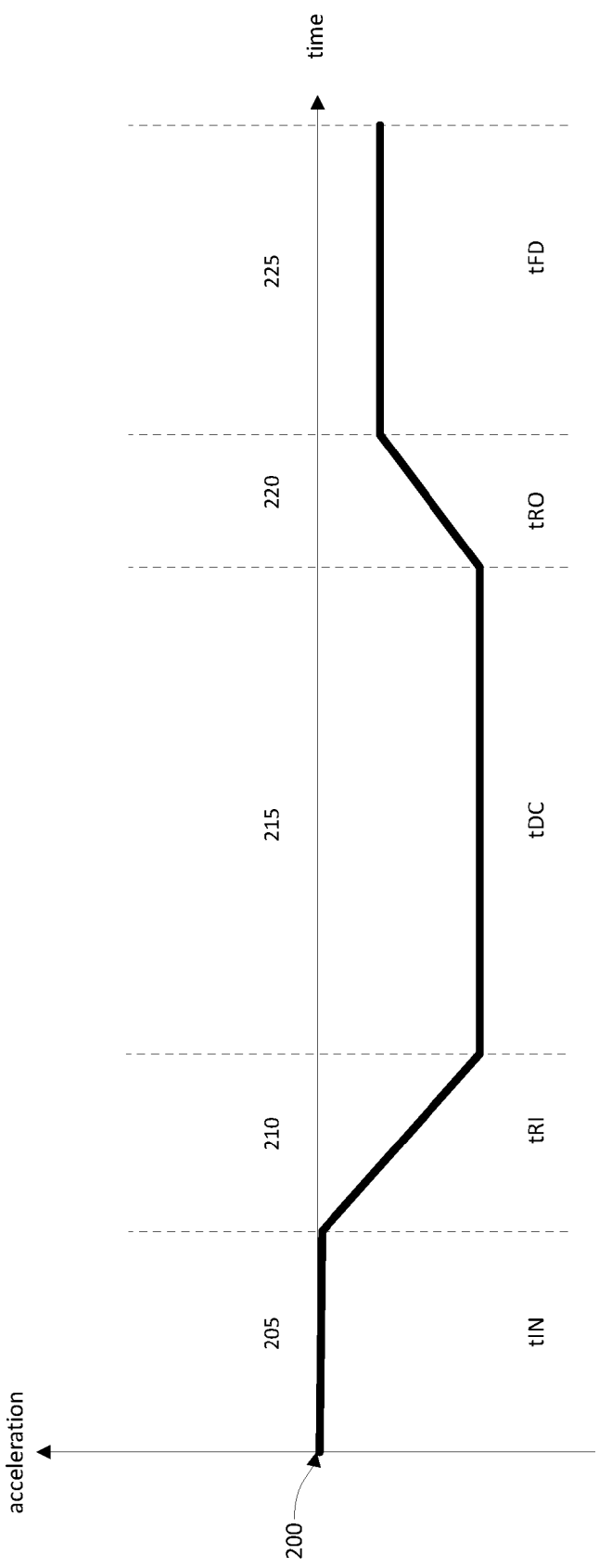
FIG. 2 is a chart of an example trajectory based on the distance to stop.

FIG. 2 illustrates an example acceleration plot 200 for a distance to stop. The plot 200 has vehicle 101 acceleration on its vertical axis and time on its horizontal axis, representing the acceleration of a vehicle 101 over a period of time. The acceleration plot 200 includes five acceleration segments: an initiation segment 205, a ramp-in segment 210, a deceleration segment 215, a ramp-out segment 220, and a final deceleration segment 230. The term "constant" here means "substantially the same throughout the segment," e.g., in the initiation segment 205, the vehicle 101 may maintain a constant speed and the computing device 105 adjusts the brake and/or propulsion subsystems 107 to maintain substantially the same speed as prescribed in the initiation segment 205.

The computing device 105 may plot the trajectory based on the requested stopping distance, which includes a total predicted elapsed time for the trajectory based on the current vehicle 101 speed. The trajectory typically includes at least four of the five acceleration segments, each segment representing a prescribed acceleration or jerk and lasting for a predicted portion of the predicted elapsed time. The segments represent instructions that the computing device 105 uses to actuate the propulsion and/or brake subsystems 107 to maintain the prescribed acceleration or jerk for the specified time. The trajectory of the plot 200 is divided into five segments, as described above, to provide the vehicle 101 occupant with a comfortable transition from vehicle 101 movement to a standstill. The trajectory may be divided into any number of segments with respective prescribed accelerations or jerks to provide the vehicle 101 occupant with a comfortable, e.g., perceived as smooth, transition to the standstill.

The plot 200 typically starts with the initiation segment 205. The segment 205 is defined as the segment where the vehicle 101 acceleration is zero prior to beginning the deceleration of the vehicle 101 with the prescribed accelerations of the other segments, i.e., the state of the vehicle 101 prior to decelerating. The time assigned to the initiation segment 205 is indicated as tIN. In the initiation segment 205, the computing device 105 maintains the speed and acceleration that the vehicle 101 had prior to the request to stop. In this example, the vehicle 101 was travelling at a constant speed, so for the initiation segment 205, to maintain this constant speed, the acceleration is zero. The time assigned to the initiation segment 205 tIN may be determined by the computing device 105 based on the requested distance to stop. For the initiation segment 205, the time tIN represents the period of time that the computing device 105 actuates the propulsion and/or brake subsystems 107 to maintain the vehicle 101 at the prior speed and acceleration prescribed by the initiation segment 205. In certain situations, the stopping distance requires an immediate deceleration, and the plot 200 may omit the initiation segment 205 and start in the ramp-in segment 210.

The plot 200 transitions from the initiation segment 205 to the ramp-in segment 210. The segment 210 is defined as the segment of the trajectory where the vehicle 101 reduces its acceleration to a value of acceleration that will reduce the vehicle 101 speed to a predetermined speed threshold in a predetermined period of time, typically by prescribing a negative jerk. The time assigned to the ramp-in segment 210 tRI may be determined by the computing device 105 based on the requested distance to stop and represents the amount of time the computing device 105 actuates the propulsion and/or brake subsystems 107 to maintain the jerk prescribed in the ramp-in segment 210. In this example, the ramp-in segment maintains a constant negative jerk and the acceleration of the vehicle 101 is prescribed to decrease at a constant rate, i.e., the jerk is a negative constant. The jerk may be limited by a predetermined negative jerk limit jRI to limit the amount of jerk applied to the vehicle 101. The negative jerk limit jRI may allow the vehicle 101 to decelerate more smoothly. The ramp-in segment 210 may have a positive jerk if, e.g., the vehicle 101 is decelerating faster in the initiation segment 205 than a deceleration target aDC used in the deceleration segment 215.

The plot 200 transitions from the ramp-in segment 210 to the deceleration segment 215. The deceleration segment 215 is defined as the segment of the trajectory where the vehicle 101 reduces its speed by maintaining a negative acceleration until the vehicle 101 speed reaches a predetermined speed threshold, typically by prescribing a constant negative acceleration. The deceleration segment 215 typically reduces the vehicle 101 speed the most during the trajectory. The time assigned to the deceleration segment 215 tDC may be determined by the computing device 105 based on the requested distance to stop and/or a speed threshold vRO and represents the amount of time the computing device 105 actuates the propulsion and/or brake subsystems 107 to maintain the deceleration prescribed in the deceleration segment 215. In this example, the deceleration is constant, i.e., the jerk is zero, and the acceleration is prescribed to a constant negative value, providing a constant decrease in vehicle 101 speed. The acceleration may be limited by a deceleration target aDC.

The plot 200 transitions from the deceleration segment 215 to the ramp-out segment 220. The ramp-out segment 220 is defined as the segment of the trajectory where the acceleration of the vehicle 101 increases from the acceleration prescribed in the deceleration segment 215 to an acceleration prescribed in the final segment 225, typically by prescribing a positive jerk. The time assigned to the ramp-out segment 220 tRO may be determined by the computing device 105 based on the requested distance to stop. The ramp-out segment 220 starts when the predicted vehicle 101 speed reaches the speed threshold vRO, i.e., the plot 200 transitions to the ramp-out segment 220 when the computing device 105 predicts that the vehicle 101 reaches the speed threshold vRO. Typically, the ramp-out segment 220 is the penultimate segment of the trajectory 200, i.e., the segment immediately preceding the final segment of the trajectory 200. In the ramp-out segment 220, the trajectory prescribes an increasing acceleration, i.e., the jerk is positive. In this example, the jerk is a positive constant, producing a constantly increasing acceleration, but the jerk may alternatively increase in either an increasing or decreasing manner. The computing device 105 may actuate the vehicle propulsion and/or brake systems 107 to maintain the jerk. The jerk may be limited by a predetermined positive jerk limit jRO to limit the amount of jerk applied to the vehicle 101. The jerk limits jRI, jRO may be predetermined and stored in the data store 106 and/or received from the server 125. The jerk limits jRI, jRO may be equal in absolute value, i.e., the magnitude of the negative jerk limit jRI may be equal to the magnitude of the positive jerk limit jRO:

$$jRO=-jRI; |jRO|=|jRI|$$

The plot 200 transitions from the ramp-out segment 220 to the final deceleration segment 225. The final deceleration segment 225 is defined as the segment of the trajectory where the vehicle 101 slows to a standstill, typically by prescribing a deceleration, and is the final segment of the trajectory. The time assigned to the final deceleration segment 225 tFD may be determined by the computing device 105 based on the requested distance to stop. In this example, the trajectory prescribes a constant deceleration aFD, i.e. the jerk is zero and the acceleration is a constant negative value, until the vehicle 101 speed decreases to a complete stop, i.e. a standstill. However, the trajectory may prescribe any appropriate deceleration, i.e., an exponentially decreasing acceleration, a linearly decreasing acceleration, etc. The ramp-out segment 220 and the final deceleration segment 225 may provide a smoother deceleration to the standstill than, e.g., maintaining the negative acceleration of the deceleration segment 215 to the standstill. The computing device 105 may actuate the vehicle propulsion and/or brake systems 107 to maintain the constant deceleration.

Figure 3:
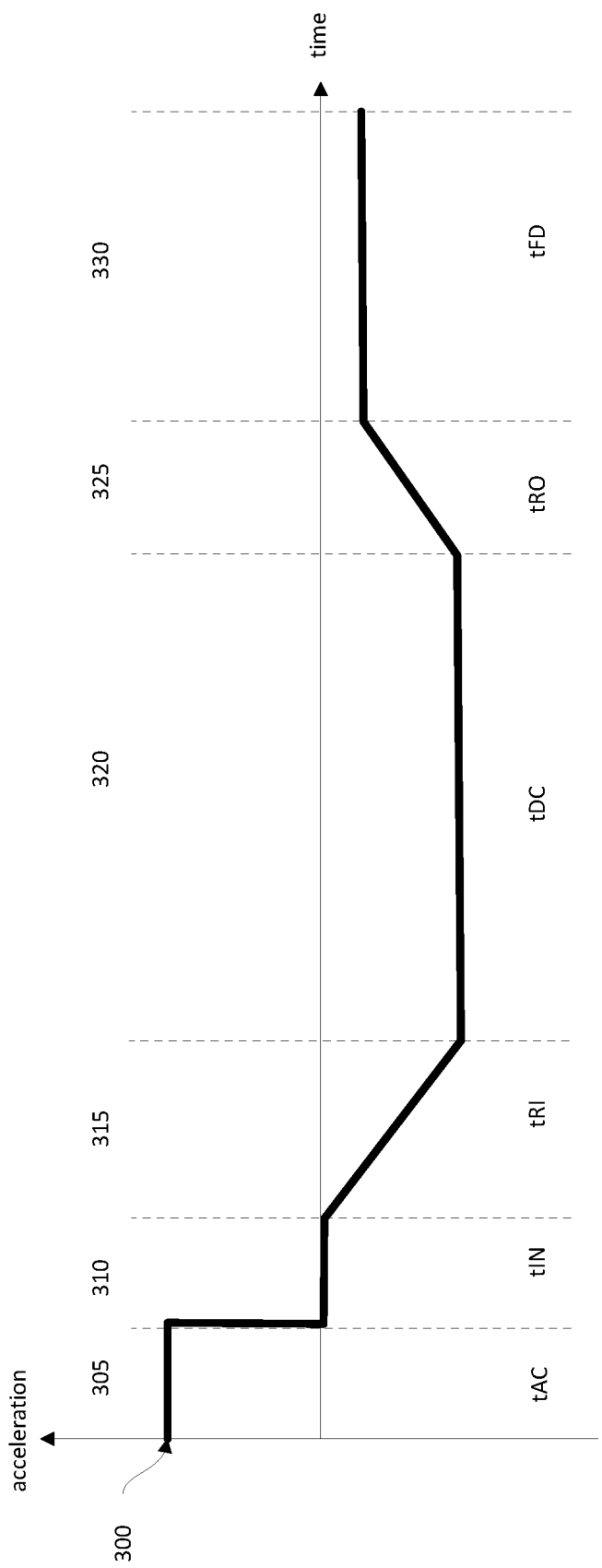
FIG. 3 is a chart of another example trajectory with a positive speed segment.

FIG. 3 illustrates an example acceleration plot 300 for a distance to stop when a positive acceleration is required, e.g., the requested distance to stop is farther than the distance at which the vehicle 101 would stop if decelerating from the current vehicle 101 speed. In these situations, the trajectory requires a positive acceleration segment for the vehicle 101 to be propelled the requested distance to stop. For example, if the vehicle 101 is at a standstill, e.g. a stop sign, the vehicle 101 cannot reach the requested distance, and must positively accelerate from the standstill. Therefore, in addition to segments corresponding to those shown in the plot 200, the plot 300 includes an additional segment, a positive acceleration segment 305, to allow the computing device 105 to actuate the subsystems 107 to provide this propulsion. The plot 300 has vehicle 101 acceleration on its vertical axis and time on its horizontal axis.

The plot 300 starts with the positive acceleration segment 305. The positive acceleration segment 305 is defined as the segment of the trajectory where the vehicle 101 maintains a positive acceleration to propel the vehicle 101 forward to reach the distance to stop. The time assigned to the positive acceleration segment 305 tAC may be determined by the computing device 105 based on the requested distance to stop and the speed predicted to be needed to reach the stopping distance. In this example, the trajectory prescribes a constant acceleration aAC, allowing the computing device 105 to actuate the subsystems 107 to provide an increasing vehicle 101 speed to allow the vehicle 101 to reach the requested stopping distance. The trajectory may prescribe any appropriate acceleration, e.g., a linearly increasing or decreasing positive acceleration, an exponentially increasing or decreasing positive acceleration, etc.

Next, the plot 300 transitions from the positive acceleration segment 305 to an initiation segment 310. As described for the initiation segment 205 in the example of FIG. 2 above, the trajectory reduces the acceleration to zero, prescribing a constant speed for a time tIN to be maintained by the computing device 105 actuating the subsystems 107. The time assigned to the constant speed segment 310 tCS may be determined by the computing device 105 based on the requested distance to stop.

The plot 300 transitions from the initiation segment 310 to the ramp-in segment 315. As described for the ramp-in segment 210 above, the trajectory prescribes a deceleration, here a constant negative jerk, for a time tRI. The jerk may be limited by a predetermined negative jerk limit jRI to limit the amount of jerk applied to the vehicle 101. The negative jerk limit may allow the vehicle 101 to decelerate more smoothly.

The plot 300 then transitions from the ramp-in segment 315 to the deceleration segment 320. As described for the deceleration segment 215 above, the trajectory prescribes a negative acceleration, here, a constant negative acceleration, i.e. the jerk is zero. The time assigned to the deceleration segment 320 tDC may be determined by the computing device 105 based on the requested distance to stop and/or a speed threshold vRO. In this example, the jerk is zero, and the acceleration is a prescribed constant negative value, allowing the computing device 105 to actuate the subsystems 107 to provide a decrease in vehicle 101 speed. The acceleration may be limited by a deceleration target aDC.

The plot 300 then transitions from the deceleration segment 320 to the ramp-out segment 325. As described above for the ramp-out segment 220 in the example of FIG. 2 above, the trajectory prescribes an increasing acceleration, i.e., the jerk is positive, for a time tRO. The trajectory may transition to the ramp-out segment 325 when the predicted vehicle 101 speed reaches the speed threshold vRO. Typically, the ramp-out segment 325 will be the penultimate segment, i.e., the segment immediately prior to the final segment of the trajectory 300. The jerk may be limited by a predetermined positive jerk limit jRO to limit the amount of jerk applied to the vehicle 101. As above, the jerk limits jRI, jRO may be equal in absolute value, i.e., the magnitude of the negative jerk limit jRI may be equal to the magnitude of the positive jerk limit jRO:

$$jRO = -jRI; \ |jRO| = |jRI|$$

The plot 300 then transitions from the ramp-out segment 325 to the final deceleration segment 330. As described above for the final deceleration segment 225, the trajectory prescribes a negative acceleration aFD for a time tFD, i.e., until the vehicle 101 reaches a standstill and the requested stopping distance is reached. The negative acceleration may be a constant negative acceleration, a linearly increasing or decreasing negative acceleration, an exponentially increasing or decreasing negative acceleration, or any appropriate acceleration curve for the vehicle 101 to reach the stopping distance. The final deceleration segment 330 is the final segment of the trajectory 300, and the trajectory 300 ends when the deceleration brings the vehicle 101 to a standstill.

Figure 4:
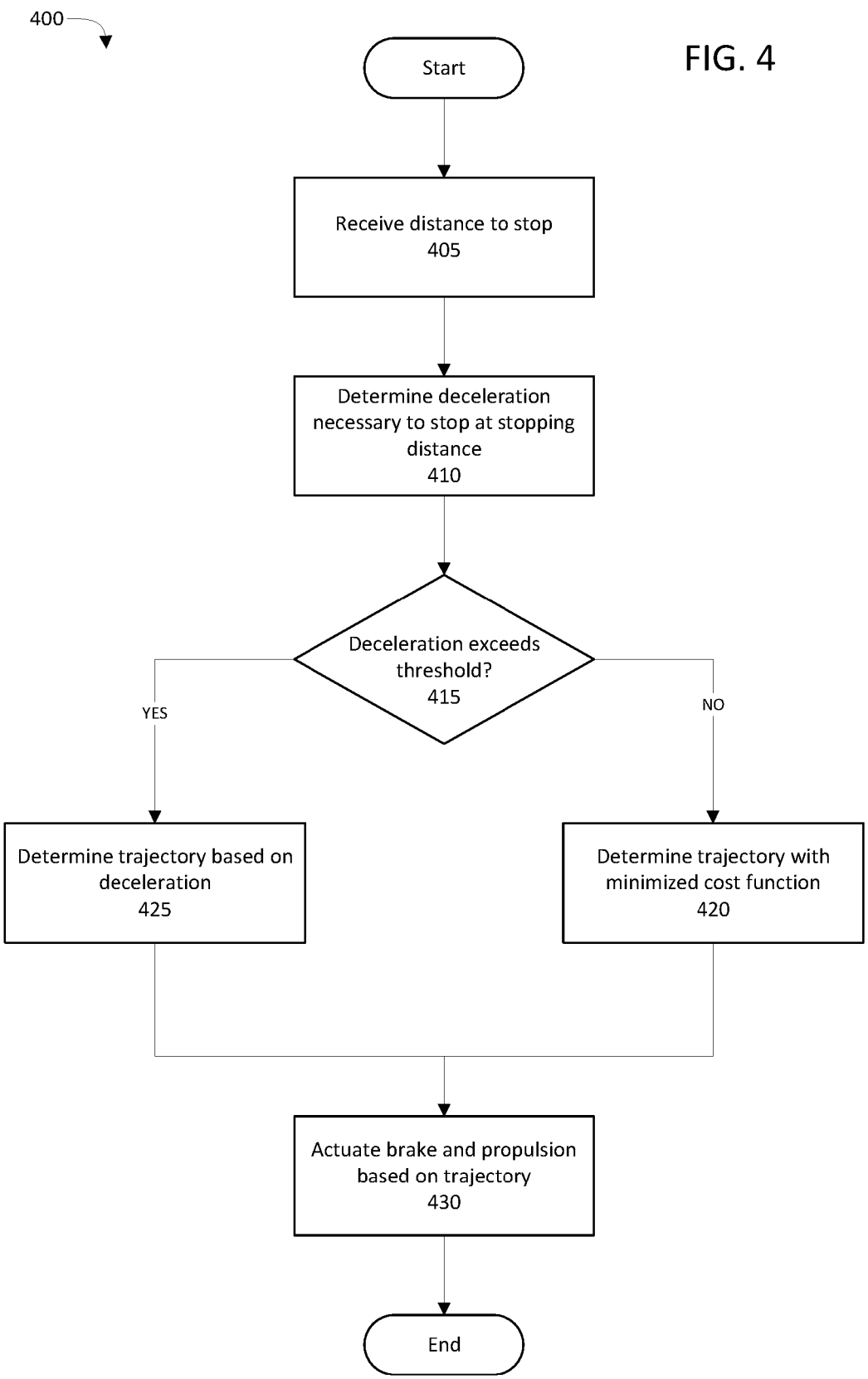
FIG. 4 is a diagram of a process for determining the trajectory to stop a vehicle at the distance to stop.

FIG. 4 illustrates an example process 400 for determining a trajectory to stop the vehicle 101 at the distance to stop. The process 400 beings in a block 405, in which the computing device 105 detects, e.g., based on data 115, an object that requires a stop, e.g. a stop sign, another vehicle 101, etc., and instruct the computing device 105 to determine the stopping distance based on the object.

Next, in a block 410, the computing device 105 determines a deceleration necessary to stop at the stopping distance. The computing device 105 receives a projected stopping distance based on current vehicle 101 velocity and acceleration from, e.g., a data collector 110, the server 125, etc. The computing device 105 then determines the constant deceleration required to reach the stopping distance. The vehicle 101 may be moving at a speed that, without additional propulsion, would decrease to a stop before the stopping distance. For example, the vehicle 101 may be stopped at a stop sign, and the stopping distance may be the distance to the next stop sign. In this situation, the trajectory will require at least one positive acceleration segment to reach the stopping distance. Alternatively, the projected stopping distance may be very close, requiring an immediate stop and high deceleration.

Next, in a block 415, the computing device 105 compares the deceleration to a predetermined deceleration threshold. If the constant deceleration exceeds the predetermined threshold, then the trajectory does not require an initiation segment 205, 310, and the process 400 continues in the block 425. Otherwise, the process 400 continues in a block 420.

In the block 420, the computing device determine a trajectory of the vehicle 101 based on the stopping distance and a cost function. The computing device 105 first initializes a trajectory including a constant acceleration segment and a constant speed segment. The computing device 105 then calculates a cost function J. The cost function J may be as follows:

$$J = P_1 \cdot a_{rms} + P_2 \cdot \frac{1}{t_{cs}} + P_3 \cdot t_{total}$$

where $a_{rms}$ is the root-mean-square of the acceleration of the vehicle 101 over the trajectory, as is known, $t_{cs}$ is the assigned duration time of the constant speed segment, $t_{total}$ is the total stop duration, and $P_1$, $P_2$, $P_3$ are predetermined tunable constants. The computing device 105 then minimizes the cost function J using known cost function optimization methods. For example, the computing device 105 may calculate a trajectory based on an initialized deceleration aDC, which is a component of the root-mean-square acceleration $a_{rms}$. The computing device 105 may then calculate another trajectory with a deceleration aDC reduced by an acceleration step ΔaDC, that is, $aDC_{new} = aDC - \Delta aDC$. If the cost function J of the new trajectory (using $aDC_{new}$) is lower than the cost function J of the current trajectory, the new trajectory is saved and another new trajectory is calculated based on a constant deceleration aDC reduced by another step ΔaDC. The computing device 105 continues to calculate trajectories and cost functions for those trajectories for a plurality of constant decelerations aDC, decrementing the decelerations by the step ΔaDC each time. When the trajectory requires the acceleration segment 305, the cost function J may include the acceleration during the positive acceleration segment aAC and the speed during the initiation segment 310 vIN. The computing device 105 may then select the trajectory that has the lowest cost function J and use that trajectory to actuate the brake and/or propulsion subsystems 107. The process 400 then continues in the block 430.

In the block 425, the computing device 105 determines a trajectory of the vehicle 101 based on the stopping distance without the initiation segment 205, 310. That is, the trajectory includes segments for each of ramp-in, deceleration, ramp-out, and final deceleration. The computing device 105 determines the trajectory based on a lower speed threshold input into the distance to stop. Jerk limits jRO, jRI are selected based on the minimum negative acceleration, i.e., aDC. Specifically, the distance to stop is evaluated to determine a trajectory based on an initialized speed threshold vRO. The trajectory includes a time period assigned to a ramp-in segment tRI, a deceleration segment tDC, a ramp-out segment tRO, and a final deceleration segment tSD. If the amount time assigned to the ramp-in and deceleration segments is less than the amount of time assigned to the ramp-out and final deceleration segments, that is, (tRI+tDC)<(tRO+tFD), then the speed threshold is decreased by a step ΔvRO, that is, $vRO_{new} = vRO - \Delta vRO$. The computing device 105 then recalculates the trajectory based on $vRO_{new}$, iterating with new values of vRO reduced by the step ΔvRO until (tRI+tDC)≥(tRO+tFD), at which point the computing device 105 saves the current trajectory. In general, the time assigned to the entire trajectory, $t_{total}$, may be divided into the four segments based on the current vehicle 101 speed, the jerk limits jRI, jRO, the deceleration target aDC, and the speed threshold vRO to determine the amount of time assigned to each segment. The process 400 then continues in a block 430.

In the block 430, the computing device 105 adjusts at least one of a brake and a propulsion 107 based on the trajectory, and the process 400 ends. For example, the computing device 105 may actuate the brake to produce the necessary negative jerk for the constant negative jerk segment. In another example, the computing device 105 may actuate the propulsion to maintain the constant speed during the constant speed segment. The example trajectories 200, 300 illustrate strict transitions between the prescribed accelerations and jerks between the segments, and the vehicle subsystem 107 may smoothly transition from the prescribed acceleration and jerk of one segment to the prescribed acceleration and jerk of another segment. That is, the trajectories 200, 300 illustrate an idealized acceleration curve, while the vehicle subsystems 107 will approximate the trajectories as closely as possible.

Figure 5:
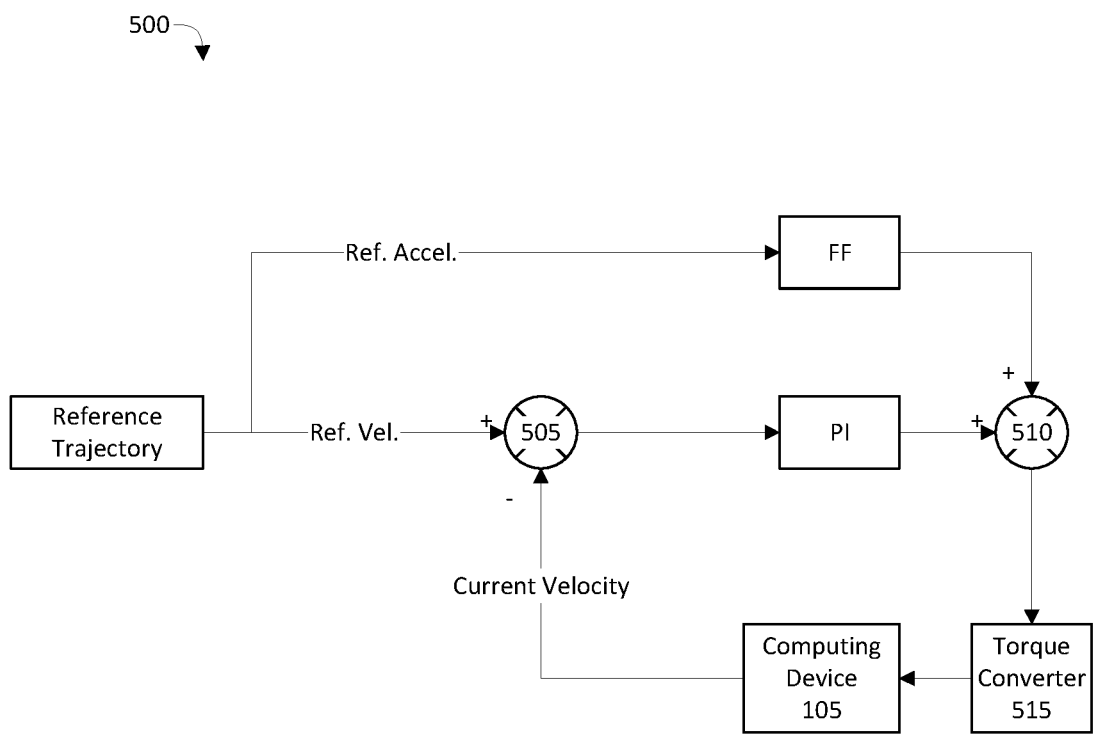
FIG. 5 is a block diagram of a process for actuating a vehicle component based on the trajectory.

FIG. 5 illustrates a process 500 for actuating a vehicle subsystem 107 based on the trajectory. The process 500 sends the a reference velocity of the trajectory and the current vehicle 101 velocity to a first summing point 505, where the current vehicle 101 velocity is subtracted from the reference velocity to determine the amount of change in velocity is required to match the trajectory. The difference, is sent through a proportional-integral control PI, which outputs an acceleration command to a second summing point 510.

A reference acceleration of the trajectory is sent through a feedforward control FF, as is known, and then sent to the second summing point 510. Here, the acceleration command and the feedforward control are summed at the summing point 510 and sent to a torque demand converter 515.

The torque demand converter 515 takes the result from the second summing point 510 and converts the value into an instruction, as is known, to adjust a vehicle subsystem 107, e.g., a propulsion, a brake, a powertrain, etc. The instruction is then sent to the computing device 105, which adjusts the vehicle subsystems 107 according to the instruction and sends a current vehicle 101 velocity back to the first summing point 505 to be compared to the next part of the trajectory. The process 500 then continues until the trajectory is complete.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer including a processor and a memory, the memory storing instructions executable by the computer to:
  receive a distance to stop a vehicle;
  plot a trajectory including a plurality of acceleration segments according to the distance, the segments being respective portions of the trajectory prescribing at least one of an acceleration and a jerk over a specified period of time; and
  adjust at least one of a vehicle brake and a vehicle propulsion based on the plotted trajectory;
  wherein the plotted trajectory includes at least one segment having a prescribed jerk.

2. The system of claim 1, wherein the instructions further include instructions to determine the trajectory based on a minimized cost function based on an acceleration, a time duration of a first segment of the trajectory, and a total stop duration, the total stop duration being a period of time from a start of the trajectory to an end of the trajectory.

3. The system of claim 2, wherein the instructions include instructions to determine a deceleration necessary to reach the distance to stop and to recalculate the trajectory with the minimized cost function when the deceleration is below a predetermined threshold.

4. The system of claim 1, wherein the trajectory includes a positive acceleration segment that prescribes a positive acceleration.

5. The system of claim 4, wherein the instructions include instructions to start the trajectory with the positive acceleration segment to actuate the vehicle propulsion to move the vehicle from a standstill.

6. The system of claim 1, wherein the instructions further include instructions to determine at least one of a maximum positive jerk and a maximum negative jerk, and to limit the prescribed jerk of the segments to below the maximum positive jerk and above the maximum negative jerk.

7. The system of claim 1, wherein the instructions further include instructions to determine a threshold speed, the threshold speed defining when a penultimate segment of the trajectory begins.

8. The system of claim 7, wherein the threshold speed is determined at least in part based on a period of time assigned to a segment prescribing a negative acceleration.

9. The system of claim 8, wherein the instructions further include instructions to:
initialize the threshold speed;
determine the trajectory based on the threshold speed, the trajectory including ramp-in, deceleration, ramp-out, and final deceleration segments;
determine a period of time assigned to each segment of the trajectory; and
determine a new trajectory based on a new threshold speed, the new threshold speed being the current threshold speed less a constant speed value, when the sum of the time assigned to the ramp-in and deceleration segments is less than the sum of the time assigned to ramp-out and the final deceleration segments;
wherein the ramp-in segment prescribes a negative jerk, the deceleration segment prescribes a negative acceleration, the ramp-out segment prescribes a positive jerk, and the final deceleration segment prescribes a negative acceleration and is the last segment of the trajectory.

10. The system of claim 1, wherein the instructions further include instructions to receive an instruction from a virtual vehicle operator to determine the trajectory to stop the vehicle.

11. A method, comprising:
receiving a distance to stop a vehicle;
plotting a trajectory including a plurality of acceleration segments according to the distance, the segments being respective portions of the trajectory prescribing at least one of an acceleration and a jerk over a specified period of time; and
adjusting at least one of a vehicle brake and a vehicle propulsion based on the trajectory;
wherein the trajectory includes a segment having a prescribed jerk.

12. The method of claim 11, further comprising determining the trajectory based on a minimized cost function based on the acceleration, the time duration of a first segment of the trajectory, and a total stop duration, the total stop duration being a period of time from a start of the trajectory to an end of the trajectory.

13. The method of claim 12, further comprising determining a deceleration necessary to reach the distance to stop and to recalculate the trajectory with the minimized cost function when the deceleration is below a predetermined threshold.

14. The method of claim 11, wherein the trajectory includes a positive acceleration segment that prescribes a positive acceleration.

15. The method of claim 14, further comprising starting the trajectory with the positive acceleration segment to actuate the vehicle propulsion to move the vehicle from a standstill.

16. The method of claim 11, further comprising determining at least one of a maximum positive jerk and a maximum negative jerk, and to limit the prescribed jerk of the segments to below the maximum positive jerk and above the maximum negative jerk.

17. The method of claim 11, further comprising determining a threshold speed, the threshold speed defining when the penultimate segment of the trajectory begins.

18. The method of claim 17, wherein the threshold speed is determined at least in part based on a period of time assigned to a segment defining a negative acceleration.

19. The method of claim 18, further comprising:
initializing the threshold speed;
determining the trajectory based on the threshold speed, the trajectory including ramp-in, deceleration, ramp-out, and final deceleration segments;
determining a period of time assigned to each segment of the trajectory; and
determining a new trajectory based on a new threshold speed, the new threshold speed being the current threshold speed less a constant speed value, when the sum of the time assigned to the ramp-in and deceleration segments is less than the sum of the time assigned to the ramp-out and the final deceleration segments;
wherein the ramp-in segment prescribes a negative jerk, the deceleration segment prescribes a negative acceleration, the ramp-out segment prescribes a positive jerk, and the final deceleration segment prescribes a negative acceleration and is the last segment of the trajectory.

20. The method of claim 11, further comprising receiving an instruction from a virtual vehicle operator to determine the trajectory to stop the vehicle.

* * * * *